(12) United States Patent
Park

(10) Patent No.: US 8,971,203 B2
(45) Date of Patent: *Mar. 3, 2015

(54) COMBINING CHANNEL QUALITY MEASUREMENTS BASED ON SOUNDING REFERENCE SIGNALS AND DEMODULATION REFERENCE SIGNALS

(71) Applicant: Telefonaktiebolaget L M Ericsson (publ), Stockholm (SE)

(72) Inventor: Chester Park, San Jose, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/101,539

(22) Filed: Dec. 10, 2013

(65) Prior Publication Data

US 2014/0098696 A1  Apr. 10, 2014

Related U.S. Application Data

(63) Continuation of application No. 13/421,055, filed on Mar. 15, 2012, now Pat. No. 8,717,927.

(51) Int. Cl.
*G01R 31/08* (2006.01)
*G06F 11/00* (2006.01)
(Continued)

(52) U.S. Cl.
CPC .............. *H04L 43/08* (2013.01); *H04B 7/0452* (2013.01); *H04B 7/0632* (2013.01)
USPC ........... 370/252; 370/246; 370/247; 370/250; 370/251

(58) Field of Classification Search
USPC ......... 370/242–247, 250–252, 328, 335, 342, 370/441, 479; 455/422.1–425, 450–452.2
See application file for complete search history.

(56) References Cited

U.S. PATENT DOCUMENTS

2008/0013610 A1  1/2008  Varadarajan et al.
2009/0262695 A1* 10/2009  Chen et al. .................... 370/329
(Continued)

FOREIGN PATENT DOCUMENTS

EP       2 360 852 A2    8/2011
JP       2011-109473 A   6/2011
(Continued)

OTHER PUBLICATIONS

International Search Report, PCT Application No. PCT/IB2013/052030, Aug. 2, 2013.
(Continued)

*Primary Examiner* — Awet Haile
*Assistant Examiner* — Eric Myers
(74) *Attorney, Agent, or Firm* — Myers Bigel Sibley & Sajovec, P.A.

(57) ABSTRACT

A first communication node communicates by multiple-input-multiple-output (MIMO) wireless communications with a second communication node of a wireless communication system. The method includes receiving a Sounding Reference Signal (SRS) over a plurality of subcarriers transmitted by the second communication node for MIMO communications. Channel quality is measured responsive to the sounding reference signal to output a first channel quality value. A demodulation reference signal is received over a plurality of subcarriers transmitted by the second communication node for MIMO communications. Channel quality is measured responsive to the demodulation reference signal to output a second channel quality value. Reliability of the measurements of the first channel quality value and the second channel quality value is determined. The first and second channel quality values are combined while compensating for the determined reliability difference between the measurements to generate a combined channel quality value. Related communication nodes are disclosed.

8 Claims, 6 Drawing Sheets

(51) Int. Cl.
*G08C 15/00* (2006.01)
*H04J 1/16* (2006.01)
*H04J 3/14* (2006.01)
*H04L 1/00* (2006.01)
*H04L 12/26* (2006.01)
*H04B 7/04* (2006.01)
*H04B 7/06* (2006.01)

(56) References Cited

U.S. PATENT DOCUMENTS

2010/0246527 A1* 9/2010 Montojo et al. ............ 370/330
2012/0269084 A1   10/2012 Okubo et al.

FOREIGN PATENT DOCUMENTS

WO   WO 01/43309 A2     6/2001
WO   WO 2011/017968 A1  2/2011

OTHER PUBLICATIONS

Written Opinion of the International Searching Authority, PCT Application No. PCT/IB2013/052030, Aug. 2, 2013.

Telatar, "Capacity of Multi-antenna Gaussian Channels", *European Transactions on Telecommunications*, vol. 10, No. 6, Nov.-Dec. 1999, pp. 585-595.

* cited by examiner

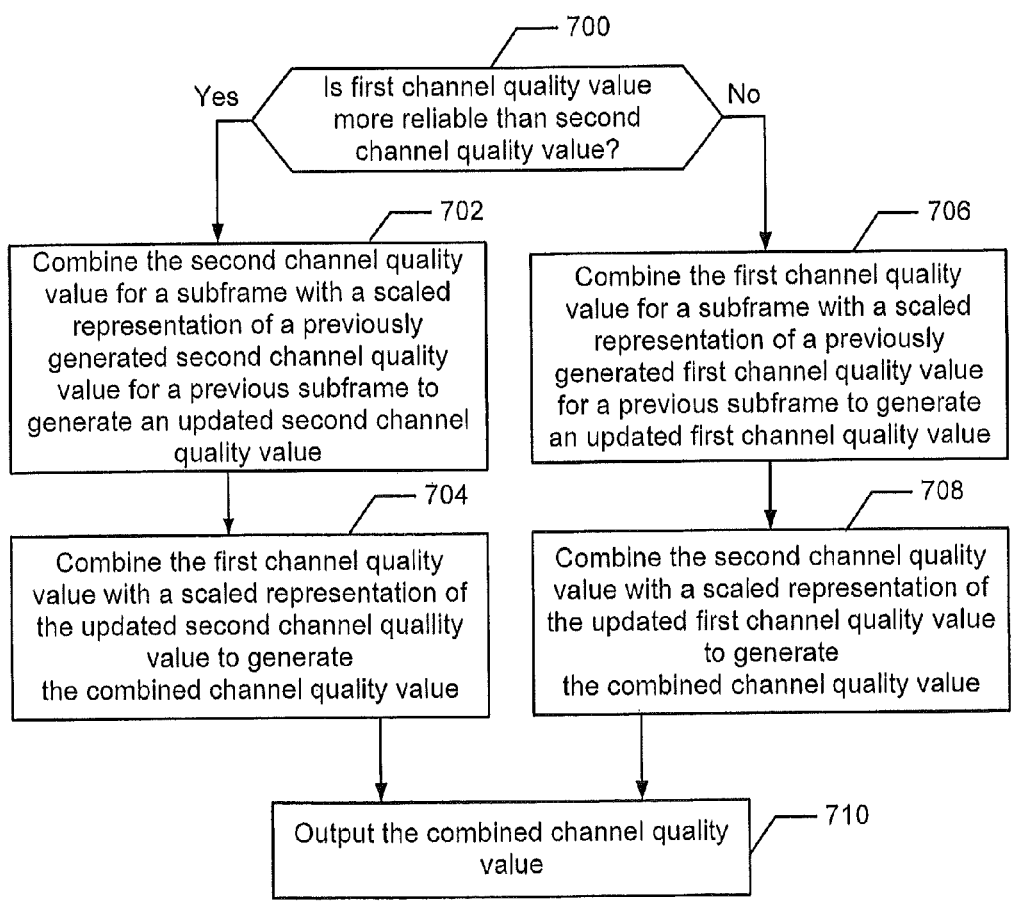

COMBINING CHANNEL QUALITY MEASUREMENTS BASED ON SOUNDING REFERENCE SIGNALS AND DEMODULATION REFERENCE SIGNALS

RELATED APPLICATIONS

The present application claims the benefit of priority from U.S. patent application Ser. No. 13/421,055 entitled "COMBINING CHANNEL QUALITY MEASUREMENTS BASED ON SOUNDING REFERENCE SIGNALS AND DEMODULATION REFERENCE SIGNALS" filed Mar. 15, 2012, the disclosure of which is hereby incorporated herein in its entirety by reference.

TECHNICAL FIELD

The present disclosure is directed to wireless communications and, more particularly, to multiple-input multiple-output wireless communications and related network nodes and wireless terminals.

BACKGROUND

In a typical cellular radio system, user equipment units (also referred to as UEs, wireless terminals, and/or mobile stations) communicate via a radio access network (RAN) with one or more core networks. The RAN covers a geographical area which is divided into cell areas, with each cell area being served by a radio base station (also referred to as a network node, a "NodeB", and/or enhanced NodeB "eNodeB"). A cell area is a geographical area where radio coverage is provided by the base station equipment at a base station site. The base stations communicate through radio communication channels with UEs within range of the base stations.

Moreover, a cell area for a base station may be divided into a plurality of sectors surrounding the base station. For example, a base station may service three 120 degree sectors surrounding the base station, and the base station may provide a respective directional transceiver and sector antenna array for each sector.

Multi-antenna techniques can significantly increase capacity, data rates, and/or reliability of a wireless communication system as discussed, for example, by Telatar in "Capacity Of Multi-Antenna Gaussian Channels" (European Transactions On Telecommunications, Vol. 10, pp. 585-595, November 1999). Performance may be improved if both the transmitter and the receiver for a base station sector are equipped with multiple antennas (e.g., an antenna array) to provide a multiple-input multiple-output (MIMO) communication channel(s) for the base station sector. Such systems and/or related techniques are commonly referred to as MIMO. The LTE standard is currently evolving with enhanced MIMO support and MIMO antenna deployments. A spatial multiplexing mode is provided for relatively high data rates in more favorable channel conditions, and a transmit diversity mode is provided for relatively high reliability (at lower data rates) in less favorable channel conditions.

In an uplink from a UE transmitting from an antenna array over a MIMO channel to a base station in the sector, for example, spatial multiplexing (or SM) may allow the simultaneous transmission of multiple symbol streams over the same frequency from the UE antenna array. Thus, multiple symbol streams may be transmitted from the UE to the base station over the same downlink time/frequency resource element (TFRE) to provide an increased data rate.

Similarly, in a uplink from the same UE to the same base station, transmit diversity (e.g., using space-time codes) may allow the simultaneous transmission of the same symbol stream over the same frequency from different antennas of the UE antenna array. Thus, the same symbol stream may be transmitted from different antennas of the UE antenna array to the base station over the same time/frequency resource element (TFRE) to provide increased reliability of reception at the base station due to transmit diversity gain.

The base station and the UE can use adaptive transmission to compensate for dynamic changes in the channel quality therebetween. The adaptive transmission can include channel-dependent scheduling, adaptive MIMO, and adaptive modulation and coding scheme (MCS) that is applied to transmissions. In general, the channel quality varies across time (e.g., frame), frequency (e.g., subcarrier), and space (e.g., antenna port of the spaced apart antennas), which implies the use of time-dependent/frequency-dependent/space-dependent adaptation of the transmissions.

A limiting factor in the ability to effectively adapt such transmissions is the need to reliably measure channel quality. A channel quality measurement is typically based on a reference signal (also referred to as a preamble or a pilot) that is transmitted by the UE to the base station, or vice versa.

Some wireless communication systems adopt several different kinds of reference signals that are not completely aligned in time, frequency, or space. Although certain advantages may be obtained if channel quality could be estimated using heterogeneous reference signals, the lack of time, frequency, and/or space alignment of the reference signals can substantially degrade the reliability of the resulting channel quality estimate.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

SUMMARY

It is therefore an object to address at least some of the above mentioned disadvantages and/or to improve performance in a wireless communication system.

Some embodiments of the present invention provide a method of operating a first communication node is provided. The first communication node communicates by multiple-input-multiple-output (MIMO) wireless communications with a second communication node of a wireless communication system. The method includes receiving a sounding reference signal over a plurality of subcarriers transmitted by the second communication node for MIMO communications. Channel quality is measured responsive to the sounding reference signal to output a first channel quality value. A demodulation reference signal is received over a plurality of subcarriers transmitted by the second communication node for MIMO communications. Channel quality is measured responsive to the demodulation reference signal to output a second channel quality value. Reliability of the measurements of the first channel quality value and the second channel quality value is determined. The first channel quality value and the second channel quality value are combined while compensating for a difference between the determined reliability of the measurements to generate a combined channel quality value.

In certain embodiments, because the reliability of the channel quality value based on the sounding reference signal and the channel quality value based on the demodulation reference signal is determined, the combined channel quality value can be generated with higher reliability (e.g., accuracy).

Some embodiments of the present invention provide a first communication node that includes an antenna array, a transceiver, and a processor. The antenna array includes a plurality of MIMO antenna elements. The transceiver is coupled to the antenna array, and is configured to receive communications through the antenna array from a second communication node of a wireless communication system. The received communications include a sounding reference signal received over a plurality of subcarriers and a demodulation reference signal received over a plurality of subcarriers. The processor is coupled to the transceiver and configured to measure channel quality responsive to the sounding reference signal to output a first channel quality value, and measure channel quality responsive to the demodulation reference signal to output a second channel quality value. The processor determines reliability of the measurements of the first channel quality value and the second channel quality value, and combines the first channel quality value and the second channel quality value while compensating for a difference between the determined reliability of the measurements to generate a combined channel quality value.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention. In the drawings:

FIGS. 4-9 are flow charts illustrating operations and methods that can be performed by base stations and/or wireless terminals according to some embodiments.

DETAILED DESCRIPTION

Figure 1:
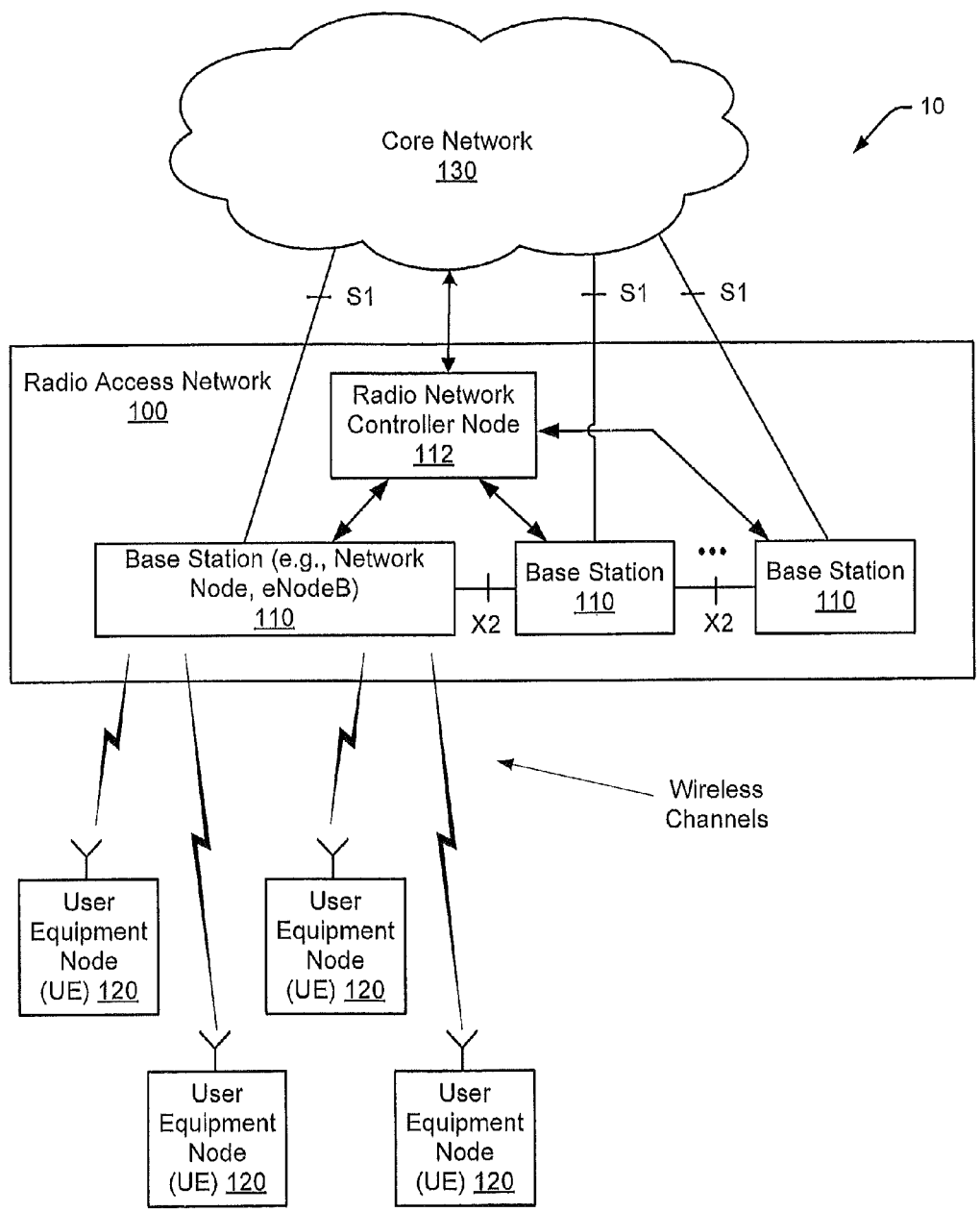
FIG. 1 is a block diagram of a communication system that is configured according to some embodiments.

The invention will now be described more fully hereinafter with reference to the accompanying drawings, in which examples of embodiments of the invention are shown. This invention may, however, be embodied in many different forms and should not be construed as limited to the embodiments set forth herein. It should also be noted that these embodiments are not mutually exclusive. Components from one embodiment may be tacitly assumed to be present/used in another embodiment.

For purposes of illustration and explanation only, various embodiments of the present invention are described herein in the context of operating in a RAN that communicates over radio communication channels with UEs. It will be understood, however, that the present invention is not limited to such embodiments and may be embodied generally in any type of communication network. As used herein, a UE can include any device that can communicate through one or more wireless RF channel with a communication system, and may include, but is not limited to, a mobile telephone ("cellular" telephone), laptop/portable computer, tablet computer, and/or desktop computer.

In some embodiments of a RAN, several base stations can be connected (e.g., by landlines or radio channels) to a radio network controller (RNC). The radio network controller, also sometimes termed a base station controller (BSC), supervises and coordinates various activities of the plural base stations connected thereto. The radio network controller is typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) technology. UTRAN, short for UMTS Terrestrial Radio Access Network, is a collective term for the Node B's and Radio Network Controllers which make up the UMTS radio access network. Thus, UTRAN is essentially a radio access network using wideband code division multiple access for UEs.

The Third Generation Partnership Project (3GPP) has undertaken to further evolve the UTRAN and GSM based radio access network technologies. In this regard, specifications for the Evolved Universal Terrestrial Radio Access Network (E-UTRAN) are ongoing within 3GPP. The Evolved Universal Terrestrial Radio Access Network (E-UTRAN) comprises the Long Term Evolution (LTE) and System Architecture Evolution (SAE).

Note that although terminology from 3GPP ($3^{rd}$ Generation Partnership Project) LTE (Long Term Evolution) is used in this disclosure to exemplify embodiments of the invention, this should not be seen as limiting the scope of the invention to only these systems. Other wireless systems may also benefit from exploiting embodiments of the present invention disclosed herein. Accordingly, although various embodiments are described in the context of controlling uplink transmissions from a UE to a base station based on the LTE standards, the scope of the invention is not limited thereto.

Also note that terminology such as base station (also referred to as a network node, eNodeB or Evolved Node B) and UE (also referred to as a wireless terminal) should be considering non-limiting and does not imply a certain hierarchical relation between the two. In general a base station (e.g., an "eNodeB") and a UE may be considered as examples of respective different communication nodes that communicate with each other over a wireless radio channel. While embodiments discussed herein may focus on wireless transmissions in an uplink from a UE to a base station, embodiments of the invention may also be applied, for example, in the downlink.

Example Communication System

FIG. 1 is a block diagram of a communication system that is configured to operate according to some embodiments of the present invention. An example RAN 100 is shown that may be a Long Term Evolution (LTE) RAN. Radio base station nodes (e.g., eNodeBs) 110 may be connected directly to one or more core networks 130, and/or radio base stations 110 may be coupled to core networks 130 through one or more radio network controller node (RNC) 112. In some embodiments, functions of the RNC 112 may be performed by the base stations 110. The base stations 110 communicate over wireless RF channels with UEs 120 that are within their respective communication service cells (also referred to as coverage areas). The base stations 110 can communicate with one another through an X2 interface and with the core network(s) 130 through S1 interfaces, as is well known to one who is skilled in the art.

Example UE and Base Station Configurations

Figure 2:
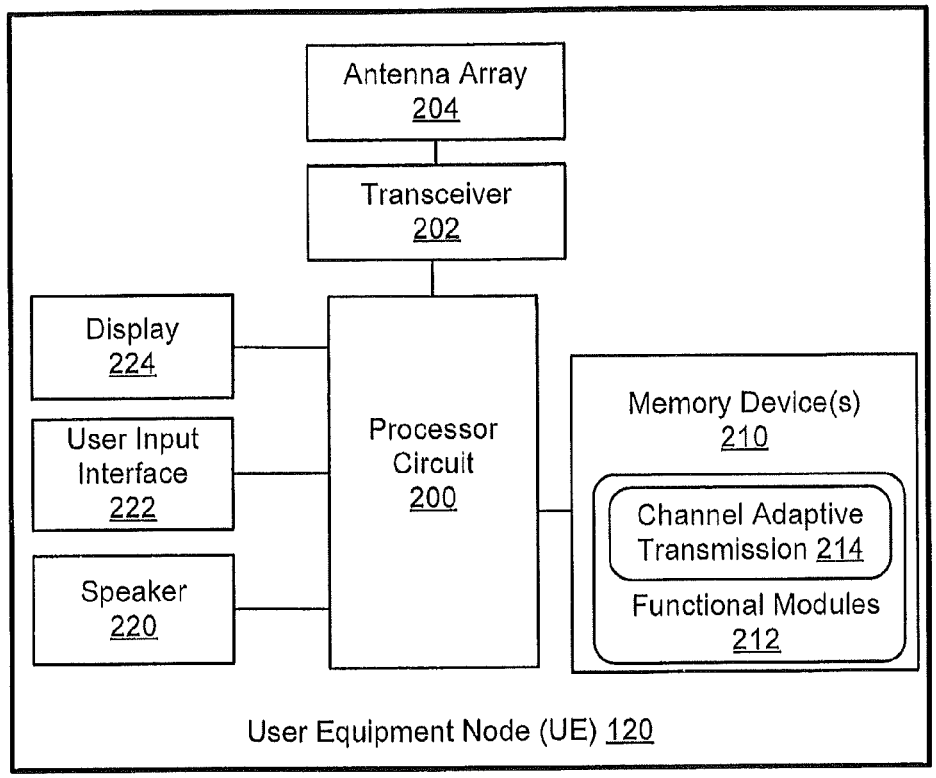
FIGS. 2 and 3 are block diagrams of a UE and a base station, respectively, configured according to some embodiments.

FIG. 2 is a block diagram of a UE 120 which is configured according to some embodiments of the present invention. The UE 120 includes transceiver(s) 202, a processor circuit 200, and a memory device(s) 210 containing functional modules 212. The UE 120 may further include other elements, such as a display 224, a user input interface 222, and a speaker 220.

The transceiver 202 is configured to communicate with a base station (e.g., network node, Node B) through an antenna array 204 via wireless air-interface channels according to operations and methods disclosed herein. By providing a plurality of antenna elements in the antenna array 204, the UE 120 may receive MIMO communications allowing spatial multiplexing and/or diversity gain as discussed above. A maximum number of downlink MIMO channels that may be received simultaneously during multi-point and/or single-point MIMO by UE 120 may be equal to the number of antenna elements included in the antenna array 204.

The processor 200 may include one or more data processing circuits, such as a general purpose and/or special purpose processor (e.g., microprocessor and/or digital signal processor). The processor 200 is configured to execute computer program instructions from a channel adaptive transmission module 214 among the functional modules 212 of the memory device(s) 210, described below as a computer readable medium, to perform at least some of the operations and methods described herein as being performed by a UE in accordance with one or more embodiments of the present invention.

The UE 102 may be a mobile telephone ("cellular" telephone), a data terminal, and/or another processing device with wireless communication capability, such as, for example, a desktop computer, a tablet computer, a laptop computer, an electronic book reader, and/or a video game console.

Figure 3:
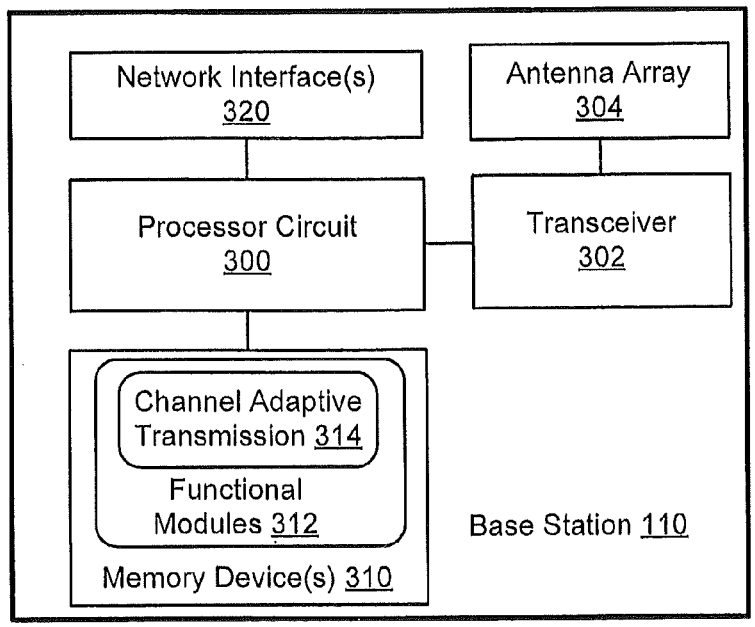

FIG. 3 is a block diagram of a base station 110 configured according to some embodiments of the present invention, and elements of which may be included in a radio network node, such as an evolved Node B, a RNC, and/or other nodes of a communications system. The base station 110 can include one or more transceivers 302, a network interface(s) 320, a processor 300, and a memory device(s) 310 containing functional modules 312.

The transceiver(s) 302 (e.g., 3GPP compliant transceiver) is configured to communicate with a UE through an antenna array 304 via wireless air-interface channels according to operations and methods disclosed herein. By providing a plurality of antenna elements in the antenna array 304, the base station 110 may receive MIMO communications allowing spatial multiplexing and/or diversity gain as discussed above. A maximum number of uplink MIMO channels that may be received simultaneously by the base station 110 may be equal to the number of antenna elements included in the antenna array 304.

The processor 300 may include one or more data processing circuits, such as a general purpose and/or special purpose processor (e.g., microprocessor and/or digital signal processor). The processor 300 is configured to execute computer program instructions from a channel adaptive transmission module 314 among the functional modules 312 of the memory device(s) 310, described below as a computer readable medium, to perform at least some of the operations and methods described herein as being performed by a base station or other network node in accordance with one or more embodiments of the present invention.

Separate Channel Quality Estimation Using Sounding Reference Signals and Demodulation Reference Signals Channel quality measurement is often facilitated by the transmission of a known signal (such a signal referred to generically herein as a "reference signal"), such as a preamble or pilot signal. Particular embodiments of the solutions described herein may utilize both a demodulation reference signal and a sounding reference signal to measure channel quality. In such embodiments, the demodulation reference signal may represent any suitable reference signal that may be used by the receiving node (e.g., base station 110 in the uplink direction) to demodulate traffic received by that node, such as an LTE DeModulation Reference Signal (DMRS) in LTE implementations. The sounding reference signal may represent any reference signal suitable for the receiving node to use in measuring channel quality and/or for performing other operations based directly or indirectly on channel quality (e.g., channel-specific scheduling, link adaptation). Although the description below focuses, for purposes of illustration, on particular example embodiments in which the sounding reference signal represents an LTE Sounding Reference Signal (SRS) and the demodulation reference signal represents an LTE DeModulation Reference Signal (DMRS), the described solutions may be implemented using any appropriate forms of sounding reference signals and demodulation reference signals.

In accordance with some embodiments, channel quality measurements are performed using both a sounding reference signal and a demodulation reference signal. Moreover, the channel quality measurements using the sounding reference signal and the demodulation reference signal are combined while also compensating for the relative reliability of the measurements.

Channel quality measurement based on a sounding reference signal (e.g., an LTE SRS in this example embodiment) will be described first. A base station 110 signals instructions to a UE 120 that controls (configures) the UE transmission of SRS. The instructions from the base station 110 define parameters for the SRS transmission that can include periodicity of the transmissions, frequency position of the transmissions (number of subcarriers and frequency(ies) of the subcarriers), and/or bandwidth of the transmissions. Other parameters and related operations are disclosed by the following 3GPP standards documents: 1) 3GPP TSGRAN E-UTRA; Physical Channels and Modulation, 3GPP TS 36.211, V10.2.0; and 2) TS 36.213 TSGRAN E-UTRA; Physical Layer Procedures, 3GPP TS 36.213, V10.2.0.

The base station 110 receives the SRS over the air from the UE 120 and measures the channel quality over the subcarriers over which the SRS is transmitted. This channel quality may represent any appropriate indication (actual or estimated) of a quality or strength of a radio channel between the relevant elements of the communication system and/or of signals received over that channel. For instance, in the example embodiment, the base station 110 measures the channel coefficient and the interference-plus-noise power and, then uses these measurements to calculate the corresponding signal-to-interference-plus-noise-ratio (SINR) value, or another channel quality value, for each of the subcarriers over which the SRS is transmitted. The calculated SINR values for each of the subcarriers are combined with the previously calculated SINR values, while taking into account the Doppler spread.

It is sometimes necessary/desired to calculate the SINR for particular subcarriers over which the SRS is not transmitted by the UE 120, such as when the whole cell bandwidth needs to be measured, for example, in order to support channel-dependent scheduling.

Denoting the SINR of the q-th subcarrier at the i-th subframe by $SINR_{i,q}^{S}$, it can be determined by the base station 110, via the channel adaptive transmission module 314, based on the following Equation 1:

$$SINR_{i,q}^{S} = (1-\beta_q)SINR_{i-1,q}^{S} + \beta_q SINR_q^{S} \qquad \text{(Equation 1)}$$

where $SINR_q^S$ represents the aforementioned calculated SINR of the current subframe and $0 \leq \beta_q \leq 1$ represents a frequency-dependent forgetting factor of the q-th subcarrier (where the forgetting factor reduces the influence of older SINR values on a present calculated SINR value). The base station 110, via the channel adaptive transmission module 314, can perform scheduling and link adaptation of the i-th subframe based on the updated SINR $SINR_{i,q}^S$. Referring to Equation 1, it is noted that setting $\beta_q = 0$ corresponds to keeping the previous SINR ($SINR_{i-1,q}^S$), whereas setting $\beta_q = 1$ corresponds to overriding the SINR with the calculated SINR ($SINR_q^S$). In accordance with some embodiments, the value of $\beta_q$ is determined according to the reliability (accuracy) of the calculated SINR ($SINR_q^S$). The term $\beta_q$ can therefore represents a reliability based scaling value. For example, $\beta_q$ can be set to 1 ($\beta_q = 1$) in response to determining that the calculated SINR has at least a threshold reliability (compared to the previously updated SINR ($SINR_{i-1,q}^S$). In this sense, $\beta_q$ can be computed based on the Doppler spread between the subcarriers so that the SINR update in Equation 1 can incorporate multiple measurements from the previous subframes. Likewise, $\beta_q$ should be computed based on the delay spread between the subcarriers so that the SINR update can cover the subcarriers over which SRS is not transmitted.

Though SRS has been typically used by base stations for channel quality measurement, in accordance with some present embodiments, a demodulation reference signal (e.g., an LTE DMRS in this example embodiment) is also exploited to further improve the accuracy of the channel quality measurement, especially when SRS is not transmitted frequently enough or it is less reliable than DMRS, e.g., because of power control error. In particular embodiments, DMRS may always be included within every transmission slot from a UE 120 for use by a base station 110 for demodulation purposes (regardless of the configuration of the base station 110) while SRS may only be transmitted by a UE 120 periodically and on defined subcarriers. Consequently, DMRS can be used for channel quality measurement without introducing additional signaling overhead between the UE 120 and the base station 110, as opposed to SRS. The SINR of the subcarriers over which DMRS is transmitted can also be calculated in the aforementioned manner. In other words, the SINR of the q-th subcarrier at the i-th subframe by $SINR_{i,q}^D$ can be determined by the base station 110, via the channel adaptive transmission module 314, based on the following Equation 2:

$$SINR_{i,q}^D = (1-\beta_q)SINR_{i-1,q}^D + \beta_q SINR_q^D. \quad \text{(Equation 2)}$$

Combining Channel Quality Estimates from Sounding Reference Signals with Channel Quality Estimates from Demodulation Reference Signals The base station 110 is configured, via the channel adaptive transmission module 314, to combine a channel quality value (such as $SINR_{i,q}^S$ in this example embodiment) from a sounding reference signal (e.g., an LTE SRS in this example embodiment) with the channel quality value (such as $SINR_{i,q}^D$ in this example embodiment) from a demodulation reference signal (e.g., an LTE DMRS in this example embodiment) to derive an equivalent (combined) channel quality value (such as a combined SINR in this example embodiment). The equivalent (combined) channel quality value can provide a more reliable (accurate) channel quality estimate for each subcarrier that is being used to communicate in uplink from the UE 120 to the base station 110.

Although various embodiments are described herein the context of the base station 110 computing channel quality estimates from uplink SRS and DMRS transmission from the UE 120, the UE 120 may be similarly configured, via the channel adaptive transmission module 214, to compute channel quality estimates from downlink SRS and DMRS transmissions from the base station 110.

As explained above, in particular embodiments, the SRS is transmitted based on a defined schedule and on particular subcarriers, while the DMRS is transmitted in each sub-frame for use in demodulating data. When the DMRS happens to share the time and frequency dimension (but, not necessarily, the space dimension) with SRS, channel measurements can then be performed on the same subcarriers using both SRS and DMRS. The derived SINR of the q-th subcarrier at the i-th subframe be denoted by $SINR_{i,q}$. The SINR can then be sequentially updated, for example, based on DMRS first and then updated again based on SRS. The associated operations can correspond to replacing $SINR_{i,q}^S$ and $SINR_{i-1,q}^S$ by $SINR_{i,q}$ and $SINR_{i,q}^D$, respectively, in (Equation 1), and replacing $SINR_{i-1,q}^D$ by $SINR_{i-1,q}$ in (Equation 2). In other words, the SINR update can be determined by the base station 110 based on the following Equation 3:

$$SINR_{i,q}^D = (1-\beta_q)SINR_{i-1,q} + \beta_q SINR_q^D$$

$$SINR_{i,q} = (1-\beta_q)SINR_{i,q}^D + \beta_q SINR_q^S. \quad \text{(Equation 3)}$$

Potential Problems that May Arise by Use of Equations 3 to Estimate Channel Quality The sequential SINR update is simple enough to reflect the DMRS-based measurement without significant complexity increase. It may improve the accuracy of channel quality measurement, but the truth is that it is far from the optimal way. For example, the SINR update computed by Equation 3 can be further computed by the following Equation 4:

$$SINR_{i,q} = (1-\beta_q)^2 SINR_{i-1,q} + (1-\beta_q)\beta_q SINR_q^D + \beta_q SINR_q^S \quad \text{(Equation 4)}$$

Equation 4 illustrates that, although the SRS and DMRS measurements are made within the same subframe ("i"), the SRS measurement is considered more reliable than the DMRS measurement (Note that $0 \leq \beta_q \leq 1$, or equivalently, $0 \leq 1-\beta_q \leq 1$). This can be interpreted as (completely or partially, depending on $\beta_q$) overriding the DMRS measurement with the SRS measurement.

On the other hand, if the SRS-based SINR update precedes the DMRS-based SINR update, the SRS measurement is instead overridden by the DMRS measurement. Hence, this approach to the sequential SINR update, causes one measurement to always be overridden by the other measurement, more importantly, regardless of the reliability of the two measurements. This may result in a significant loss of potential gain of joint channel quality measurement, for example, when one measurement is more reliable (more accurately represents an estimation of the particular subchannel) than the other measurement. For example, the DMRS measurement tends to be more reliable than the SRS measurement when the SRS transmission involves a transmit power change from PUSCH. Furthermore, in the case of a MIMO system, when DMRS is precoded by the UE 120 with one of the non-full rank precoder matrices, the DMRS measurement contributes to the corresponding space index only (i.e., the precoder matrix used for DMRS), since the DMRS measurement simply provides the precoded channel (not the physical MIMO channel) for the base station 110.

Combining Channel Quality Measurements from Sounding Reference Signal and Demodulation Reference Signal While Compensating for Reliability of the Measurements In accordance with at least some embodiments, channel quality is separately measured using both a sounding reference signal and a demodulation reference signal. However, instead of combining the separate measurements in a way that is blind to the relative reliability of the measurements, the operations for combining the measurements are performed in a way that compensates for the relative reliability of the measurements. Thus, for example, when the channel quality measurement from SRS is more reliable than the channel quality measurement from DMRS, the channel quality measurement from SRS has more effect on the combined channel quality than the channel quality measurement from DMRS. Conversely, when the channel quality measurement from DMRS is more reliable than the channel quality measurement from SRS, the channel quality measurement from DMRS has more effect on the combined channel quality than the channel quality measurement from SRS.

Figure 4:
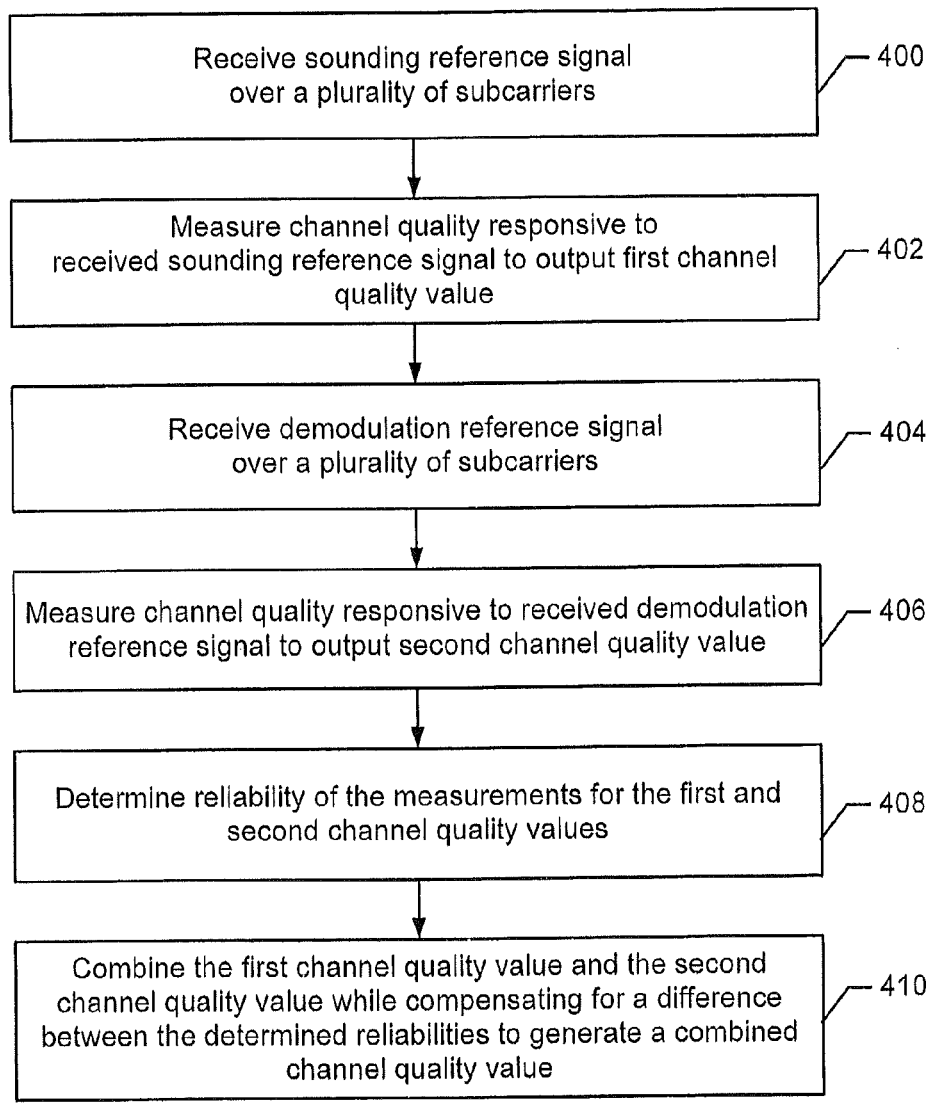

FIG. 4 is a flowchart of operations and methods may be performed by a channel adaptive transmission module and/or another component in combination with a transceiver and antenna array of the base station 110 and/or the UE 120 to generate a combined channel quality value from measurements of both a sounding reference signal and a demodulation reference signal. More specifically, in the example embodiment illustrated in FIG. 4, the combined channel quality value is generated from measurements of both an LTE SRS and an LTE DMRS. Referring to FIG. 4, the SRS is received (block 400) over a plurality of subcarriers. The channel quality is measured (block 402) responsive to the received SRS to generate a first set of channel quality values ("CQ-SRS" values here). The DMRS is received (block 404) over a plurality of subcarriers, which may or may not be the same plurality of subcarriers over which the SRS was received. The channel quality is measured (block 406) responsive to the received DMRS to generate a second set of channel quality values ("CQ-DMRS" values here).

The reliability of the measurements for the CQ-SRS values and the CQ-DMRS values is determined (block 408). The determined reliability is an indication of how accurately the CQ-SRS values and the CQ-DMRS values each represent the present quality of the channel for one or more defined subcarriers that are of-interest for being controlled responsive to the combined channel quality. The reliability of measurement of CQ-SRS may be determined based on the relative closeness in time, frequency, and/or space of the measured SRS to one or more defined subcarriers (e.g., the subcarrier which transported the DMRS). Similarly, the reliability of measurement of CQ-DMRS may be determined based on the relative closeness in time, frequency, and/or space of the measured DMRS to the one or more defined subcarriers (e.g., the subcarrier which transported the DMRS).

In some embodiments, measurement of the channel quality responsive to the SRS includes generating a Signal-to-Interference-plus-Noise Ratio, SINR, value for each of the plurality of subcarriers of the SRS. Measurement of the channel quality responsive to the DMRS includes generating an SINR value for each of the plurality of subcarriers of the DMRS. The reliability of the measurement of the CQ-SRS value can be determined based on the reliability of the SINR values for the plurality of subcarriers of the SRS, and the reliability of the measurement of the CQ-DMRS value can be determined based on the reliability of the SINR values for the plurality of subcarriers of the DMRS.

In a further embodiment, determination of the reliability of the measurement of the channel quality values for the plurality of subcarriers of the SRS can include determining the reliability of the measurement of each of the channel quality values based on a frequency separation between a subcarrier of the SRS used to measure the corresponding channel quality value and at least one subcarrier of the second communication node that is controlled by the combined channel quality value (and/or the subcarrier whose channel quality value is measured). Similarly, determination of the reliability of the measurement of the channel quality values for the plurality of subcarriers of the DMRS can include determining the reliability of the measurement of each of the channel quality values based on a frequency separation between a subcarrier of the DMRS used to measure the corresponding channel quality value and at least one subcarrier of the second communication node that is controlled by the combined channel quality value (and/or the subcarrier whose channel quality value is measured).

In a further embodiment, determination of the reliability of the measurement of the channel quality values for the plurality of subcarriers of the SRS can include determining the reliability of the measurement of each of the channel quality values based on a time separation between timing of the SRS used to measure the corresponding channel quality value and timing of a data signal from the second communication node. Similarly, determination of the reliability of the measurement of the channel quality values for the plurality of subcarriers of the DMRS comprises determining the reliability of the measurement of each of the channel quality values based on a time separation between timing of the DMRS used to measure the corresponding channel quality value and the timing of the data signal from the second communication node.

The determination of the reliability of the measurement of the channel quality values for the plurality of subcarriers of the SRS can include determining a power difference between the SRS used to measure the corresponding channel quality value and the data signal from the second communication node.

The reliability of the measurements may be determined relative to each another, such as by determining a ratio of the relative reliabilities, instead of being separate determined values. In accordance with some embodiments, the SRS and DMRS share the same time and frequency dimensions, but don't necessarily share the same space dimension.

The CQ-SRS value and the CQ-DMRS value are then combined while compensating (block 410) for a difference between the determined reliability of the measurements to generate a combined channel quality value. As will be explained in further detail below with regard to FIGS. 7-9, the compensation (block 410) for the difference between the determined measurement reliability may include controlling and operational order with which the CQ-SRS value and the CQ-DMRS value are combined (e.g., which value has a greater effect on the combined channel quality value), and/or one or both of the CQ-SRS and CQ-DMRS values may be scaled based on their relative reliability when being combined to generate the combined channel quality value.

Figure 5:
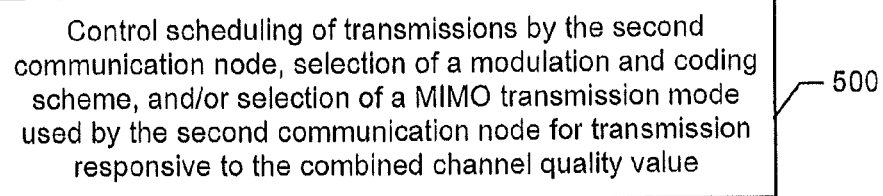

FIG. 5 is a flowchart of operations and methods that may be performed by the base station 110 and/or by the UE 120 responsive to the combined channel quality value. Referring to FIG. 5, the base station 110 (via the channel adaptive transmission module 314 and/or via other components) can use the combined channel quality value to control (block 500) scheduling transmissions by the UE 120, to control (block 500) selection of the modulation and coding scheme (MCS), and/or to control (block 500) selection of a MIMO transmission mode that is used by the UE 120 for transmission to the base station 110. Alternatively or additionally, the UE 120 (via the channel adaptive transmission module 214 and/or via other components) can then use the combined channel quality value to control (block 500) scheduling transmissions by the base station 110, and/or to control (block 500) selection of the modulation and coding scheme (MCS) and/or the MIMO transmission mode that is used by the base station 110 for transmission to the UE 120.

FIG. 6 is a flowchart of operations and methods that may be performed by the base station 110 and/or by the UE 120 to control the other node. Referring to FIG. 6, the base station 110 can transmit (block 600) a message containing information that controls periodicity, frequency, and/or bandwidth of the SRS transmitted by the UE 120. Alternatively or additionally, the UE 120 can transmit (block 600) a message containing information that controls periodicity, frequency, and/or bandwidth of the SRS transmitted by the base station 110.

One Approach for Combining Channel Quality Measurements from Sounding Reference Signals and Demodulation Reference Signals While Compensating for Reliability of the Measurements In accordance with some embodiments, an approach for combining the channel quality measurements generated based on a sounding reference signal and a demodulation reference signal for the present subframe to generate the combined channel quality measurement value is based on Equation 4, above, but uses the relative reliability of the sounding reference signal and the demodulation reference signal measurements for the present subframe to control the order with which the sounding reference signal measurement and the demodulation reference signal measurement are combined with the channel quality measurement for a previous subframe.

FIG. 7 is a flowchart of operations and methods that may be performed by the base station 110 and/or by the UE 120 to generate a combined channel quality measurement based on measurements of both a sounding reference signal and demodulation reference signal. For ease of explanation only, operations and methods will be described in the context of being performed by the base station 110 which measures an SRS and a DMRS in uplink from the UE 120, although this approach is not limited thereto and may be performed by the UE 120 on downlink and/or on any suitable form of sounding reference signal and demodulation reference signal.

Referring to FIG. 7, a determination (block 700) is made as to whether the SRS based channel quality measurement ("CQ-SRS") value is more reliable than the DMRS based channel quality measurement ("CQ-DMRS") value for a present subframe and subcarrier. The determination may include comparing a ratio of the relative CQ-SRS reliability and CQ-DMRS reliability to a defined value (e.g., 1) and selecting between two operational branches responsive to the comparison.

When the CQ-SRS measurement is more reliable, the CQ-DMRS value for the present subframe is combined (block 702) with a scaled representation of a previously generated CQ-DRMS value for a previous subframe to generate an updated CQ-DRMS value. The CQ-SRS value is then combined (block 704) with a scaled representation of the updated CQ-DRMS value to generate a combined channel quality value. The combined channel quality value is then output (block 710) for use in controlling, for example, scheduling of transmissions and/or selection of MCS used for transmissions by the UE 120.

In contrast, when the CQ-DMRS measurement is more reliable, the CQ-SRS value for the present subframe is combined (block 706) with a scaled representation of a previously generated CQ-SRS value for a previous subframe to generate an updated CQ-SRS value. The CQ-DMRS value is then combined (block 708) with a scaled representation of the updated CQ-SRS value to generate a combined channel quality value. The combined channel quality value is then output (block 710).

Figure 8:
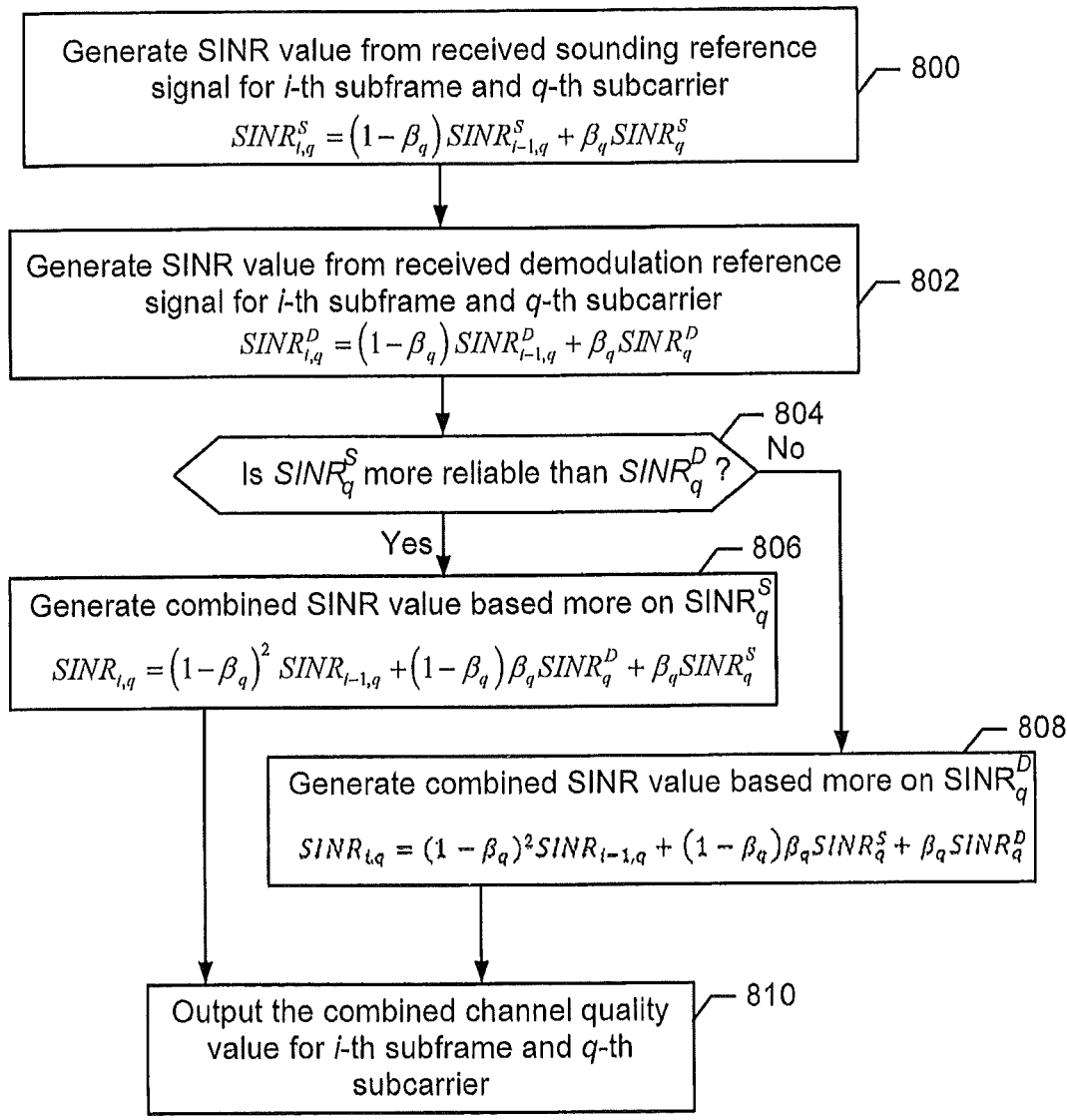

FIG. 8 is a flowchart of operations and methods that are similar to those of FIG. 7 explained above, however the channel quality measurements are now specifically related to measuring a signal-to-interference-plus-noise-ratio (SINR) value for each of the subcarriers over which the SRS is transmitted, and measuring a SINR value for each of the subcarriers over which the DMRS is transmitted. Referring to FIG. 8, a SINR value is generated (block 800) from a received SRS for the i-th subframe and q-th subcarrier according to the following Equation 5:

$$SINR_{i,q}^{S} = (1-\beta_q)SINR_{i-1,q}^{S} + \beta_q SINR_q^{S} \quad \text{(Equation 5)}$$

A SINR value is also generated (block 802) from a received DMRS for the i-th subframe and q-th subcarrier according to the following Equation 6:

$$SINR_{i,q}^{D} = (1-\beta_q)SINR_{i-1,q}^{D} + \beta_q SINR_q^{D} \quad \text{(Equation 6)}$$

A decision is then made (block 804) whether $SINR_q^S$ is more reliable than $SINR_q^D$, and, if so, then the combined SINR value is generated (block 806) based on the following Equation 7:

$$SINR_{i,q} = (1-\beta_q)^2 SINR_{i-1,q} + (1-\beta_q)\beta_q SINR_q^D + \beta_q SINR_q^S \quad \text{(Equation 7)}$$

When the decision (block 804) is opposite, the combined SINR value is generated (block 808) based on the following Equation 8:

$$SINR_{i,q} = (1-\beta_q)^2 SINR_{i-1,q} + (1-\beta_q)\beta_q SINR_q^S + \beta_q SINR_q^D \quad \text{(Equation 8)}$$

A combined channel quality value (e.g., a combined $SINR_{i,q}$ in this example) is then output (block 810) for the i-th subframe and q-th subcarrier. As explained above, the combined channel quality value can be used to control adaptive transmission by the base station 110 and/or the UE 120 to compensate for dynamic changes in the channel quality between the transmitting and receiving network nodes.

Another Approach for Combining Channel Quality Measurements from Sounding Reference Signals and Demodulation Reference Signals While Compensating for Reliability of the Measurements Another approach will now be explained for combining separate channel quality measurements from sounding reference signals and DMRS demodulation reference signals while compensating for the reliability of the measurements to generate a combined channel quality value.

An example MIMO system equipped with $N_t$ transmit antennas and $N_r$ receive antennas is described below for purposes of explanation of this approach. For ease of explanation only, operations and methods will be described in the context of being performed by the base station 110 which measures SRS and DMRS in uplink from the UE 120, although this approach is not limited thereto and may be performed by the UE 120 on downlink and/or on any appropriate type of sounding and demodulation reference signals.

Figure 9:
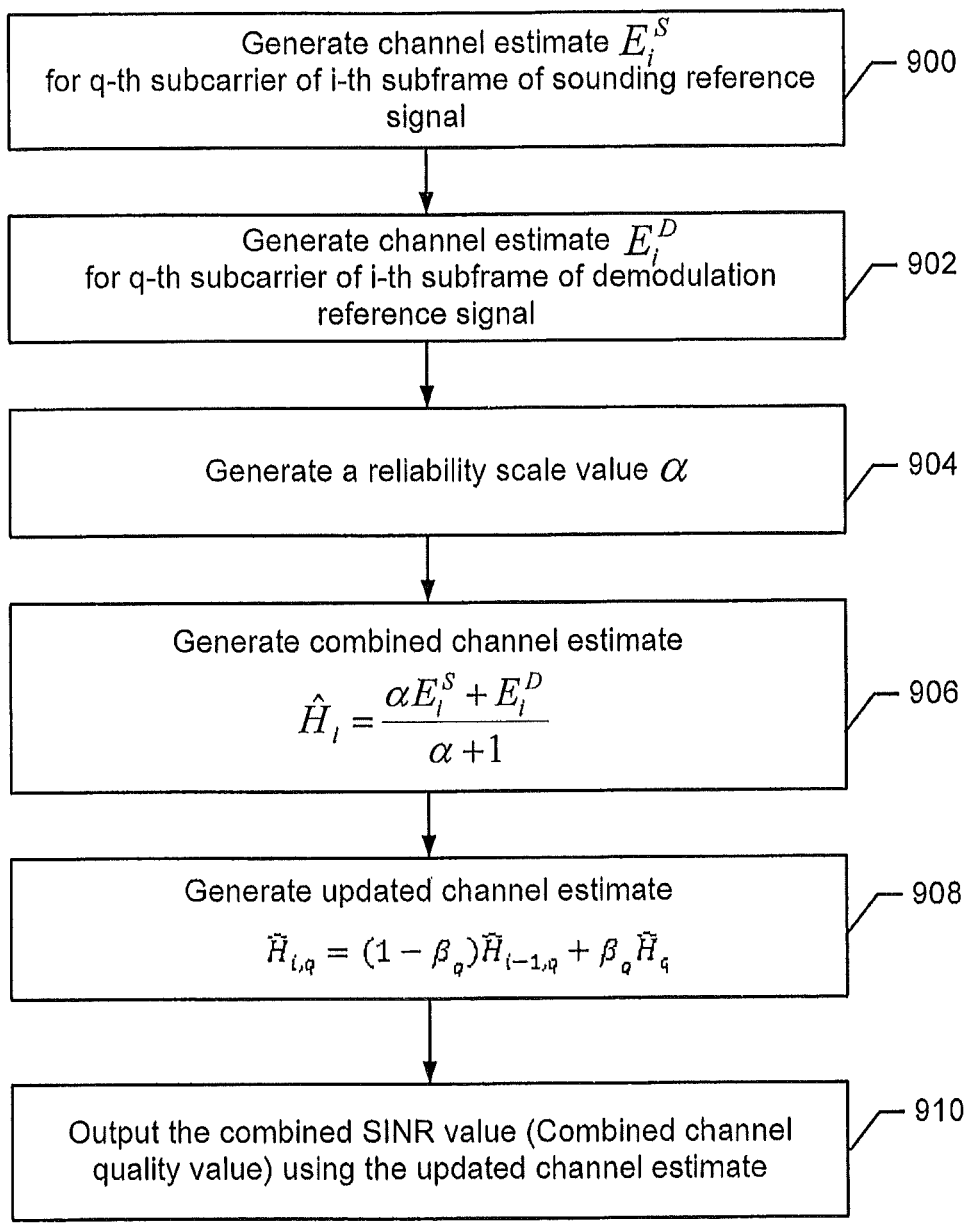

FIG. 9 is a flowchart of operations and methods may be performed by the base station 110 to generate a combined channel quality measurement based on measurements of both a sounding reference signals (e.g, an LTE SRS here) and a demodulation reference signal (e.g., an LTE DMRS). Referring to FIG. 9, it is assumed that both SRS and DMRS are transmitted at the q-th subcarrier of the i-th subframe, and DMRS is precoded with one of the rank-R precoder matrices. Denoting the $N_r \times N_t$ channel estimate of the q-th subcarrier for SRS by $E_i^S$, and the $N_r \times R$ channel estimate of the subcarrier for DMRS by $E_i^D$, the channel estimates can be respectively determined (blocks 900, 902) by the following Equations 9:

$$E_i^S = H_i + N_i^S$$

$$E_i^D = H_i W_i^D + N_i^D, \quad \text{(Equations 9)}$$

where $H_i$ represents the $N_r \times N_t$ actual channel, $W_i^D$ represents the $N_t \times R$ precoder, and $N_i^S$ and $N_i^D$ represent the $N_r \times N_t$ estimation error and the $N_r \times R$ estimation error, respectively. The estimation error also includes the error due to circuit imperfection such as phase distortion between the SRS used for the SRS used to measure the corresponding SINR value and the data signal to apply the channel quality measurement. In order to incorporate these two measurements properly, the $N_r \times (N_t + R)$ equivalent channel estimate $E_i$ is determined by the following Equation 10:

$$E_i := (E_i^S \; E_i^D). \quad \text{(Equation 10)}$$

From Equations 9 and 10, $E_i$ is determined by the following Equation 10:

$$E_i = H_i W_i + N, \quad \text{(Equation 11)}$$

where the $N_r \times (N_t + R)$ equivalent precoder $W_i$ and the $N_r \times (N_t + R)$ equivalent noise $N$ is determined by the following Equations 12:

$$W_i := (I_{N_t} \; W_i^D)$$

$$N := (N_i^S \; N_i^D) \quad \text{(Equation 12)}$$

The approach can then estimate $H_i$ from $E_i$. In this estimation, $H_i$ is the desired variable, and $E_i$ is the noisy observation and $W_i$ is the known parameter. This can also be viewed as joint measurement on the channel estimate level, in contrast with the joint measurement on the SINR level in Equation 3. As shown in Equation 9, this enables the DMRS measurement to contribute to the whole space, i.e., the SINR update of the space indices corresponding to all other precoder matrices. Note that this is not possible with the conventional sequential SINR update in Equation 3. Some conventional estimation techniques that can be used in a new way according to some embodiments for the particular estimation operation, include, but not limited to, a least square (LS) estimation, a maximum likelihood (ML) estimation, and a minimum mean square error (MMSE) estimation. The covariance of $N$ can need to be estimated for most of the estimation techniques, and it is determined by the auto-covariance and the cross-covariance of $H_i^S$ and $N_i^D$. Through the covariance, a difference between the reliability of the two measurements can be taken into account, when the equivalent channel $H_i$ is estimated from Equation 11.

As an example, LS estimation is chosen here. For simplicity, it is assumed that $N$ is zero-mean identically and independently distributed Gaussian random matrix. Then the LS estimate $\hat{H}_i$ is determined by the following Equation 13:

$$\hat{H}_i = E_i W_i^+ \quad \text{(Equation 13)}$$

where $(\cdot)^+$ represents a pseudo-inverse matrix. For example, when DMRS is precoded with the full-rank precoder matrix, i.e., $W_i^D = I_{N_t}$, $W_i^+$ is determined by the following Equation 14:

$$W_i^+ = \frac{1}{2}\begin{pmatrix} I_{N_t} \\ I_{N_t} \end{pmatrix} \quad \text{(Equation 14)}$$

and thus the estimate of $H_i$ is nothing but the average of $E_i^S$ and $E_i^D$.

When the two channel estimates have different reliability, for example, DMRS and SRS experience different power spectral density or different estimation error, $N_i^S$ and $N_i^D$ have different covariance, and $N$ is no longer identically and independently distributed Gaussian. However, when a proper estimation technique is used, the reliability difference is taken into account, when the two measurements are incorporated. For example, when the covariances of $N_i^S$ and $N_i^D$ are related by the following Equation 15:

$$E[\text{vec}(N_i^D)\text{vec}^H(N_i^D)] = \alpha E[\text{vec}(N_i^S)\text{vec}^H(N_i^S)], \quad \text{(Equation 15)}$$

the LS estimation is expressed by the following Equation 16:

$$\hat{H}_i = \left(E_i^S \frac{1}{\sqrt{\alpha}} E_i^D\right)\left(I_{N_t} \frac{1}{\sqrt{\alpha}} W_i^D\right)^+. \quad \text{(Equation 16)}$$

A reliability scale value $\alpha$ is generated (block 904) based on the relative reliability of the channel measurement from SRS relative to the reliability of the channel measurement from DMRS. When DMRS is precoded with the full-rank precoder matrix, i.e., $W_i^D = I_{N_t}$, a combined channel quality estimate, $\hat{H}_i$, is determined (block 906) by the following Equation 17:

$$\hat{H}_i = \frac{\alpha E_i^S + E_i^D}{\alpha + 1}. \quad \text{(Equation 17)}$$

Thus the weight of $E_i^S$ is scaled by the reliability scale value $\alpha$ compared to the weight of $E_i^D$. In other words, the more reliable measurement is considered more importantly than the other measurement. An updated channel estimate value for the q-th subcarrier at the i-th subframe can be determined (block 908) by the following Equation 18:

$$\hat{H}_{i,q} = (1 - \beta_q)\hat{H}_{i-1,q} + \beta_q. \quad \text{(Equation 18)}$$

A combined channel quality value (e.g., a combined SINR value) can then be output (block 910) using the updated channel estimate.

In some embodiments above, the combined channel quality estimate has been determined for subcarriers that include both SRS and DMRS. For the subcarriers over which either SRS or DMRS (but not both) is transmitted, the conventional (non-sequential) operations of Equations 1 and 2 can be applied to calculate and update the SINR of the subcarrier. For the subcarriers over which neither SRS nor DMRS is transmitted, the SINR of the subcarriers covered by SRS or DMRS (or both) can be extrapolated to cover the whole cell bandwidth.

Potential Advantages of at Least Some Embodiments

In accordance with at least some embodiments, channel quality is separately measured using both a sounding reference signal and a demodulation reference signal, and the joint measurements are combined to generate a combined channel quality estimate. However, instead of combining the separate measurements in a way that is blind to the relative reliability of the measurements, the operations for combining the measurements are performed in a way that compensates for the relative reliability of the measurements. The combined channel quality estimate can thereby have improved accuracy. Compensating for the relative reliability of the measurements may be particularly advantageous when a demodulation reference signal is precoded with one of the non-full-rank precoder matrices, because the demodulation reference signal measurement contributes to the SINR update of not only the space index used for the demodulation reference signal but also all the other space indices.

Abbreviations

DMRS Demodulation Reference Signal
MCS Modulation and Coding Scheme
MIMO Multiple Input Multiple Output
RAN Radio Access Network
SINR Signal to Interference Plus Noise Ratio
SRS Sounding Reference Signal
UE User Equipment Node Further Definitions and Embodiments In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of the invention. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention. Accordingly, the above disclosed subject matter is to be considered illustrative, and not restrictive, and the appended claims are intended to cover all such modifications, enhancements, and other embodiments, which fall within the spirit and scope of the present invention. Thus, to the maximum extent allowed by law, the scope of the present invention is to be determined by the broadest permissible interpretation of the following claims and their equivalents, and shall not be restricted or limited by the foregoing detailed description. Any reference numbers in the claims are provided only to identify examples of elements and/or operations from embodiments of the figures/specification without limiting the claims to any particular elements, operations, and/or embodiments of any such reference numbers.

The invention claimed is:

1. A method of operating a first communication node that communicates by multiple-input-multiple-output (MIMO) wireless communications with a second communication node of a wireless communication system, the method comprising:
   receiving a sounding reference signal over a plurality of subcarriers transmitted by the second communication node for MIMO communications;
   measuring a channel quality responsive to the sounding reference signal to output a first channel quality value;
   receiving a demodulation reference signal over a plurality of subcarriers transmitted by the second communication node for MIMO communications;
   measuring a channel quality responsive to the demodulation reference signal to output a second channel quality value;
   determining a reliability of the first channel quality value and a reliability of the second channel quality value; and
   combining the first channel quality value and the second channel quality value while compensating for a difference between the determined reliabilities of the channel quality values to generate a combined channel quality value based on:
      determining that the measurement of the first channel quality value is more reliable than the measurement of the second channel quality value, and responding to the determination by combining the second channel quality value for a subframe of the communications from the second communication node with a scaled representation of a previously generated second channel quality value for a previous subframe to generate an updated second channel quality value, and combining the first channel quality value with a scaled representation of the updated second channel quality value to generate the combined channel quality value; and
      determining the measurement of the second channel quality value is more reliable than the measurement of the first channel quality value, and responding to the determination by combining the first channel quality value for a subframe of the communications from the second communication node with a scaled representation of a previously generated first channel quality value for a previous subframe to generate an updated first channel quality value, and combining the second channel quality value with a scaled representation of the updated first channel quality value to generate the combined channel quality value.

2. The method of claim 1, further comprising:
   controlling scheduling of transmissions by the second communication node, selection of a modulation and coding scheme used by the second communication node, or selection of a MIMO transmission mode used by the second communication node for transmission responsive to the combined channel quality value.

3. A method of operating a first communication node that communicates by multiple-input-multiple-output (MIMO) wireless communications with a second communication node of a wireless communication system, the method comprising:
   receiving a sounding reference signal over a plurality of subcarriers transmitted by the second communication node for MIMO communications;
   measuring a channel quality responsive to the sounding reference signal to output a first channel quality value, based on generating a channel estimate for the sounding reference signal of each of a plurality of subcarriers of a defined subframe of the communications from the second communication node to output a first plurality of channel quality values;
   receiving a demodulation reference signal over a plurality of subcarriers transmitted by the second communication node for MIMO communications;
   measuring a channel quality responsive to the demodulation reference signal to output a second channel quality value, based on generating a channel estimate for the demodulation reference signal of each of the plurality of subcarriers of the defined subframe of the communications from the second communication node to output a second plurality of channel quality values; and
   determining a reliability of the first channel quality value and a reliability of the second channel quality value; and
   combining the first channel quality value and the second channel quality value while compensating for a difference between the determined reliabilities of the channel quality values to generate a combined channel quality value, based on:
      generating a plurality of reliability scale values, each one of the reliability scale values based on a ratio of the reliability of the measurement of the second plurality of channel quality values and the reliability of the measurement of the first plurality of channel quality values for a different one of the subcarriers;
   scaling at least one of the channel estimate for the sounding reference signal and the channel estimate for the demodulation reference signal using the reliability scale value;
      adding the channel estimate for the sounding reference signal and the channel estimate for the demodulation reference signal to output a summed channel quality value; and
      scaling the summed channel quality value using the reliability scale value to generate a combined channel estimate for output as the combined channel quality value.

4. The method of claim 3, further comprising:
   controlling scheduling of transmissions by the second communication node, selection of a modulation and coding scheme used by the second communication node, or selection of a MIMO transmission mode used by the second communication node for transmission responsive to the combined channel quality value.

5. A first communication node comprising:
an antenna array including a plurality of multiple-input-multiple-output (MIMO) antenna elements;
a transceiver coupled to the antenna array, wherein the transceiver is configured to receive communications through the antenna array from a second communication node of a wireless communication system, the received communications including a Sounding Reference Signal (SRS) received over a plurality of subcarriers and a demodulation reference signal received over a plurality of subcarriers; and
a processor coupled to the transceiver and configured to:
measure channel quality responsive to the sounding reference signal to output a first channel quality value;
measure channel quality responsive to the demodulation reference signal to output a second channel quality value;
determine reliability of the measurements of the first channel quality value and the second channel quality value; and
combine the first channel quality value and the second channel quality value while compensating for the determined reliability difference between the measurements to generate a combined channel quality value based on:
determining that the measurement of the first channel quality value is more reliable than the measurement of the second channel quality value, and respond by combining the second channel quality value for a subframe of the communications from the second communication node with a scaled representation of a previously generated second channel quality value for a previous subframe to generate an updated second channel quality value, and combining the first channel quality value with a scaled representation of the updated second channel quality value to generate the combined channel quality value; and
determining that the measurement of the second channel quality value is more reliable than the measurement of the first channel quality value, and response by combining the first channel quality value for a subframe of the communications from the second communication node with a scaled representation of a previously generated first channel quality value for a previous subframe to generate an updated first channel quality value, and combining the second channel quality value with a scaled representation of the updated first channel quality value to generate the combined channel quality value.

6. The first communication node of claim 5, wherein the processor is configured to:
control scheduling of transmissions by the second communication node, selection of a modulation and coding scheme used by the second communication node, or selection of a MIMO transmission mode used by the second communication node for transmission responsive to the combined channel quality value.

7. A first communication node comprising:
an antenna array including a plurality of multiple-input-multiple-output (MIMO) antenna elements;
a transceiver coupled to the antenna array, wherein the transceiver is configured to receive communications through the antenna array from a second communication node of a wireless communication system, the received communications including a Sounding Reference Signal (SRS) received over a plurality of subcarriers and a demodulation reference signal received over a plurality of subcarriers; and
a processor coupled to the transceiver and configured to:
measure channel quality responsive to the sounding reference signal to output a first channel quality value, by generating a channel estimate for the sounding reference signal of each of a plurality of subcarriers of a defined subframe of the communications from the second communication node to output a first plurality of channel quality values;
measure channel quality responsive to the demodulation reference signal to output a second channel quality value by generating a channel estimate for the demodulation reference signal of each of the plurality of subcarriers of the defined subframe of the communications from the second communication node to output a second plurality of channel quality values;
determine reliability of the measurements of the first channel quality value and the second channel quality value; and
combine the first channel quality value and the second channel quality value while compensating for the determined reliability difference between the measurements to generate a combined channel quality value by:
generating a plurality of reliability scale values, each one of the reliability scale values based on a ratio of the reliability of the measurement of the second plurality of channel quality values and the reliability of the measurement of the first plurality of channel quality values for a different one of the subcarriers;
scaling at least one of the channel estimate for the sounding reference signal and the channel estimate for the demodulation reference signal using the reliability scale value;
adding the channel estimate for the sounding reference signal and the channel estimate for the demodulation reference signal to output a summed channel quality value; and
scaling the summed channel quality value using the reliability scale value to generate a combined channel estimate for output as the combined channel quality value.

8. The first communication node of claim 7, wherein the processor is configured to:
control scheduling of transmissions by the second communication node, selection of a modulation and coding scheme used by the second communication node, or selection of a MIMO transmission mode used by the second communication node for transmission responsive to the combined channel quality value.

* * * * *